P. H. HERNDON.
INCUBATOR.
APPLICATION FILED JAN. 23, 1911.
1,018,357.
Patented Feb. 20, 1912.
2 SHEETS—SHEET 2.
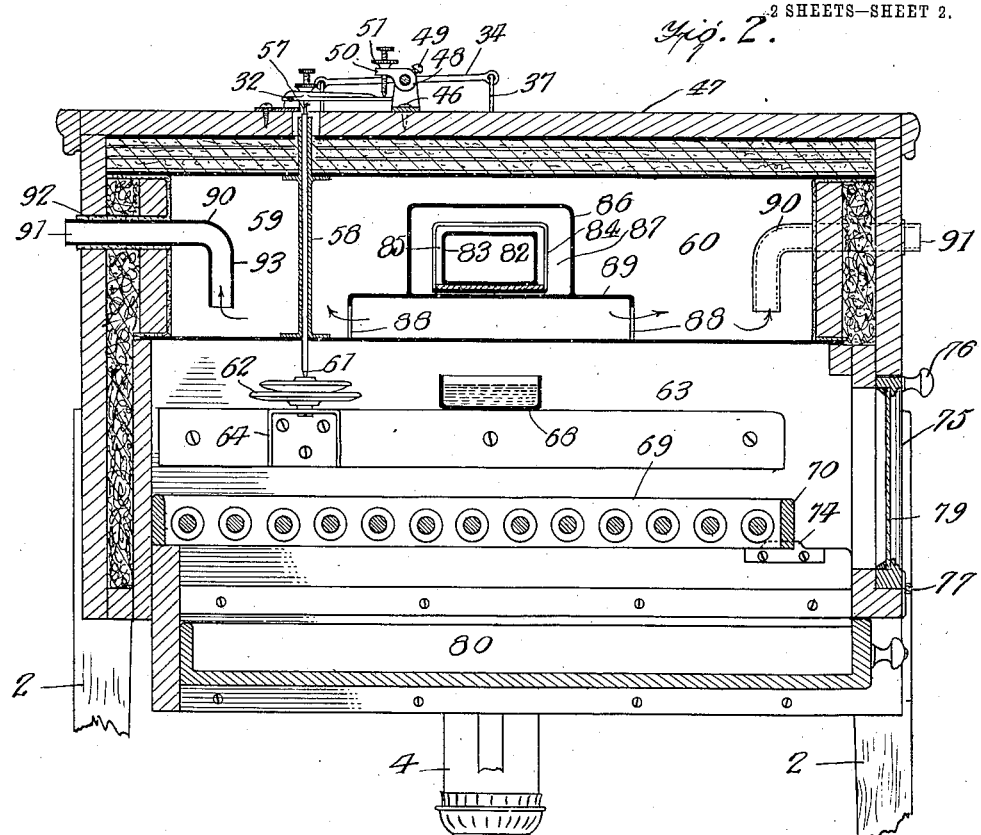
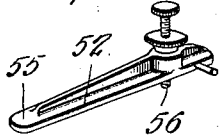
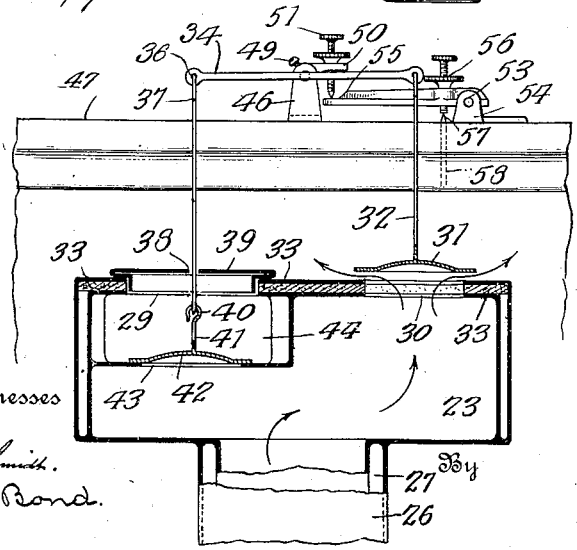
Witnesses
L.H.Schmidt.
M.A.Bond.
Inventor
PAUL H. HERNDON,
By E.H.Bond
Attorney

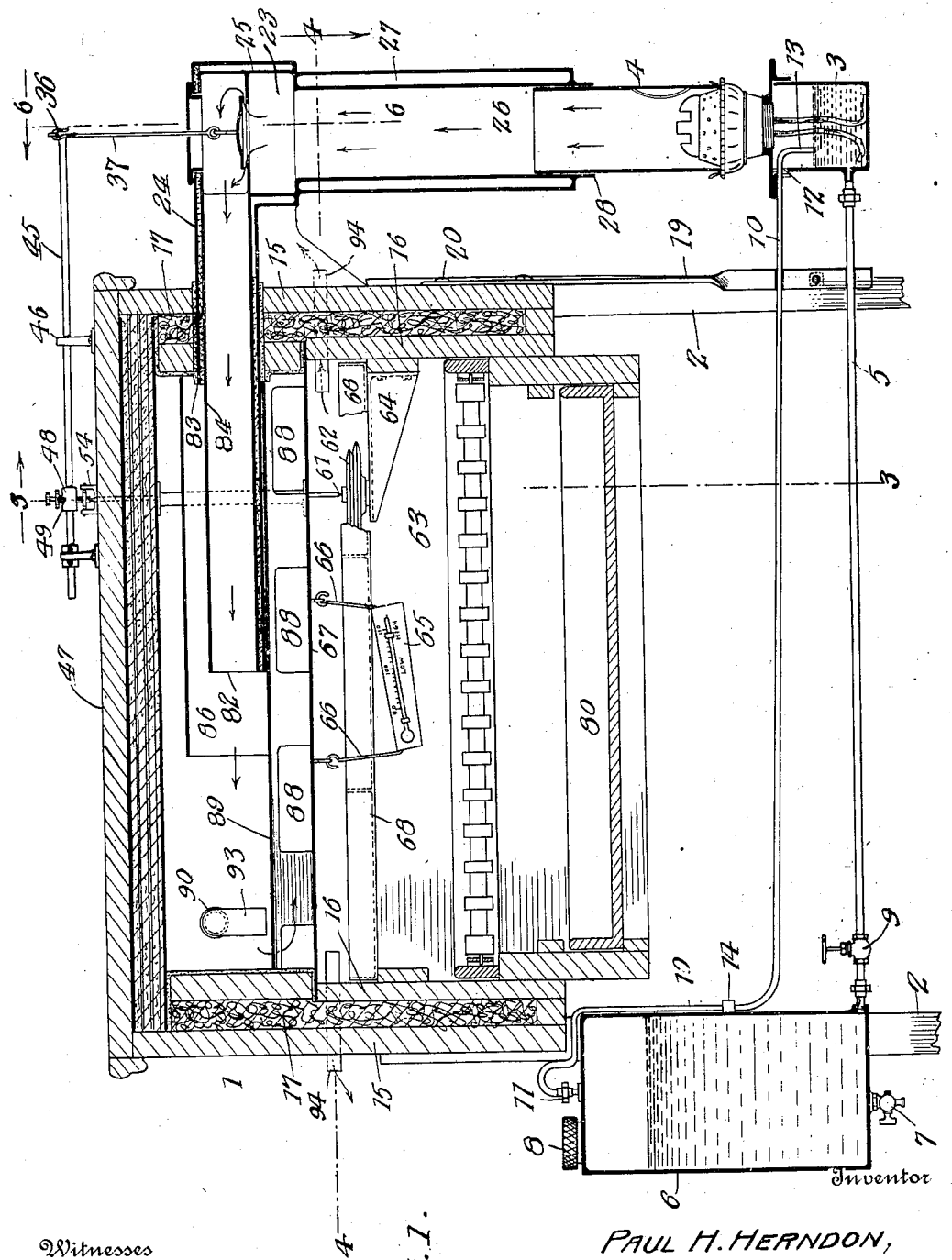

UNITED STATES PATENT OFFICE.

PAUL H. HERNDON, OF TAMPA, FLORIDA.

INCUBATOR.

1,018,357.    Specification of Letters Patent.    Patented Feb. 20, 1912.

Application filed January 23, 1911. Serial No. 604,230.

*To all whom it may concern:*

Be it known that I, PAUL H. HERNDON, a citizen of the United States of America, and resident of Tampa, in the county of Hillsboro and State of Florida, have invented certain new and useful Improvements in Incubators, of which the following is a specification.

This invention relates to certain new and useful improvements in incubators of that class in which heat is maintained within the hatching chamber by means of hot air.

The present invention has for its objects among others to provide an improved incubator of this general class having for its objects among others the following:

First, to provide for the automatic control of the admission of hot air into the hot air chamber and to provide for the equal distribution of the heat throughout the entire chamber. In the present construction I arrange for the control of the heat before its passage into the chamber, not after. Heretofore various means have been provided for the automatic control of the heat after a certain or predetermined temperature is reached. These means permit the entrance of the hot air into the chamber from which it is permitted to escape by automatic control of the escape flue or outlets. By my invention the heat within the chamber is never allowed to go beyond a certain degree. Before it exceeds a predetermined degree, all entrance of hot air is shut off. In other words, my control is disposed between the source of heat and the entrance to the hot air chamber. The results will be obvious and will be more fully hereinafter set forth.

Second, in connection with the feature above outlined, I employ a simple and improved mechanism actuated by a thermostat and in turn controlling the heat regulating means.

Third, I provide a simple, yet efficient means, for insuring equal distribution of the hot air over the floor of the hot air chamber whereby all parts of the chamber are kept at the same temperature and the hot air entering the chamber is caused to be deflected downward against the floor thereof and from thence upward through the exit or ventilating flues, the inlets into which latter are disposed at a point in proximity to the floor whereby I obtain the full benefit of the heat and yet permit of the automatic ventilation so as to keep the temperature uniform throughout the entire device. The ventilating pipes are provided with bends so as to bring their inner ends in proximity to the floor, the horizontal portions extending through the walls of the incubator.

I aim further at improvements in the details of construction whereby an improved incubator results and whereby the construction and the assemblage of the parts is facilitated, thereby enabling me to produce an incubator capable of producing the most satisfactory results at minimum cost.

Other objects and advantages of the invention will hereinafter appear and the novel features thereof will be particularly pointed out in the appended claims.

The invention, in its preferred form, is clearly illustrated in the accompanying drawings, which, with the numerals of reference marked thereon, form a part of this specification, and in which—

Figure 1 is a substantially central vertical longitudinal section through my improved incubator on an enlarged scale. Fig. 2 is a vertical transverse section on the line 3—3 of Fig. 1, looking in the direction of the arrow. Fig. 3 is a vertical section on the line 6—6 of Fig. 1, looking in the direction of the arrow, with parts broken away and portions in elevation. Fig. 4 is a perspective detail of the lever or arm controlled by the thermostat.

Like numerals of reference indicate like parts throughout the different views.

Referring to the drawings, 1 designates the incubator as a whole, the inclosing casing of which may be supported in any suitable manner, as upon legs or the like 2, which in themselves may be of any suitable form of construction to which, of course, the present invention is in no wise restricted.

While in practice any suitable source of heat may be employed in connection with the other features of the invention, I preferably employ a lamp 3 which may be of any suitable form provided with a chimney 4, the said lamp being supported in any suitable manner and designed to receive its supply of liquid fuel through a pipe 5 leading from a suitable source of supply, as a tank or reservoir 6, which latter may be supported in any suitable manner, as for instance, as shown in Fig. 1, where it is shown as supported from the inclosing casing. This tank is provided with a cock 7 whereby the contents may be drained entirely when desired and with a filling aperture at the top closed by an ordinary cap or the like 8. The pipe 5 is provided with a suitable valve 9 whereby the flow of liquid fuel from the tank to the reservoir or bowl of the lamp may be controlled or entirely shut off when desired.

10 is a pipe connected at one end with the upper end of the tank or reservoir 6 by suitable coupling or the like 11, said pipe being in the present instance shown as inclined and its lower end extended through an opening 12 in the side wall of the reservoir or bowl of the lamp and provided with a downward bend 13 which extends partially within the bowl or reservoir. When the oil in the reservoir or bowl 3 of the lamp rises to such a point as to close the end of the portion 13 of the pipe 10 within such bowl, the flow of air to the upper portion of the tank 6 is shut off and, consequently, the flow of oil to the bowl 3 is stopped. As the oil from the bowl 3 is consumed and the level of the oil in the bowl falls, uncovering the end of the depending portion 13 of the pipe 10, whereupon air flows through the pipe 10 to the upper end of the tank 6, the pressure on the top of the oil in such tank causes the oil to flow through the pipe 5 to the bowl 3. It will thus be seen that the flow of oil to the bowl 3 is automatically controlled by the amount of consumption of the oil by the burning of the lamp. No care is necessary on the part of the attendant, all that is required is that the oil in the tank 6 shall be replenished at proper intervals. The pipe 10 may be secured to the wall of the tank 6 in any suitable manner, as shown, for instance, at 14.

The walls of the inclosing chamber of the incubator are double, as seen at 15 and 16, the said walls being spaced apart and the intervening spaces being filled with any suitable heat-retaining medium, as seen at 17.

The pipes 5 and 10 may be supported near their lower end in any suitable manner, as, by a hanger or other means 19, suitably affixed, as at 20, to the end of the outer wall 15 of the inclosing casing. To this end of the casing is affixed in any suitable manner, a chamber 23, from which extends a conduit 24 passing through the walls 15 and 16 and the intermediate packing 17, as seen clearly in Fig. 1. This chamber is double walled, as seen at 25 in Fig. 1, the space between the walls forming an air space, while communicating with the bottom of this chamber is the pipe 26 which likewise is double walled, the intermediate space forming an air space 27, which air space, of course, is closed at the top and bottom, as seen clearly in said Fig. 1. This pipe or tube 26 has an annular depending flange 28 within which is received the upper end of the chimney 4 of the heating device. This chamber has in its upper wall the two openings 29 and 30. The latter is closed by a valve 31 carried by a vertical stem or rod 32 secured thereto at one end in any suitable manner. The top of this chamber has the space between its walls filled with suitable heat-retaining medium 33. The stem or rod 32 is hooked into or otherwise connected with one end of an arm 34, to the other end of which is connected, as at 36, a depending rod or stem 37. This rod or stem extends through an opening 38 in a cap 39 which closes the other opening 29 in the top of the chamber 23, as seen best in Fig. 3. The lower end of this rod or stem 37 is flexibly connected, as at 40, with the stem 41 of a valve 42 which closes an opening 43 in the bottom wall of a chamber 44 which is depressed within the chamber 23, all as clearly seen in Fig. 3. The bar 34 is rigid with a rod 45 extending at right angles thereto and joined thereto at the center of said rod 34, the rod 45 being mounted to rock in suitable bearings in the brackets or the like 46 secured to the top 47 of the inclosing casing. On the rod 45 is a sleeve 48 adjustably held thereon in any suitable manner, as by a set screw 49. This sleeve has rigid therewith an arm 50 in which is adjustably held, in any suitable manner, a vertical screw or the like 51.

52 is an arm pivotally mounted, as at 53, in brackets or the like 54 secured to the top 47 of the inclosing casing, the end of said arm farthest from its pivot having a flattened upper surface, as seen at 55, upon which rests the lower end of the adjustable screw 51, as seen best in Fig. 3. This member 52 has near its pivot a vertically adjustable screw 56, the lower end of which receives the upper pointed end 57 of a rod 58 movable through a suitable inclosing tube or casing 59 within the hot air chamber 60, the lower pointed end 61 of said rod 58 being in contact with and controlled in its up and down movements by a thermostat 62 of known construction and disposed within the egg chamber 63, the same being supported therein by any suitable means, as for instance, a bracket 64, as seen best in Fig. 1. Within this egg chamber is a thermometer 65 which may be supported in any suitable manner, as for instance by the hangers 66 depending from the bottom 67 of the hot air chamber. Within the egg chamber is a moistening pan 68 supported therein in any suitable manner, and as seen in Fig. 1 formed with a plurality of compartments. Within the egg chamber below the moistening pan is an egg tray 69 comprising a frame 70.

At the front end of the casing, opposite the egg tray, is a door 75 provided with a suitable knob or handle 76, said door being hinged, as at 77, preferably at its lower edge and adapted to be held in its closed position in any suitable manner. This door is provided with glass panels 79 so that the interior of the egg chamber may be viewed at any time when desired.

Mounted to slide on suitable guides within the casing beneath the egg tray, is a a drawer 80 into which the chickens fall after they are hatched out from the eggs.

The chamber 23 has its conduit 24, which extends through the wall of the casing as above described, extended, as seen at 82, the outer wall 83 of this conduit terminating at a point just within the hot air chamber and the inner wall 84 spaced from said outer wall leaving a surrounding space 85, as seen best in Fig. 2. This extension 82 extends substantially one half the distance across the hot air chamber, as indicated, and this, in turn, is disposed within the outer tube 86 secured to the inner wall of the chamber, leaving an air space 87 thereabout. This outer casing 86 extends beyond the end of the extension 82, as indicated in Fig. 1. By this means I insure an equal distribution of the hot air over the floor of the hot air chamber and thus all parts of the chamber are kept at the same temperature, a greater portion of the heat being radiated in all directions from the outer casing 86. The hot air entering through the conduit and the means just described is caused to be deflected downward against the floor by means of the depending walls of the outer casing and the hot air passes outward through openings 88 in the metallic plate 89 upon which the outer casing 86 is supported, as seen clearly in Figs. 1 and 2.

90 are ventilating pipes, as many in number as may be desired having their horizontal portions 91 extending through the opposite walls of the hot air chamber, being incased within suitable asbestos or other inclosures 92. The inner ends of these ventilating pipes are extended downwardly, as seen at 93, terminating at a short distance above the floor of the hot air chamber, as seen best in Fig. 2. By thus having the inlets to the ventilating pipes disposed in proximity to the floor, I obtain the full benefit of the heat and yet provide for the automatic ventilation, so as to keep the temperature uniform throughout the entire device.

94 are ventilating pipes for the egg chamber. They are disposed at the back of the chamber.

The closure or damper 31 is made slightly heavier than the closure or damper 42 so as to slightly overbalance the latter, so that under normal conditions, that is when the proper amount of heat is within the incubator, the damper or closure 31 will be closed and, consequently, the damper 42 open. This same effect might be obtained by reason of the weight of the arm 50 which is upon the side of the pivot 45 nearest the end which carries the rod 32 connected with the closure or damper 31. In fact, these two features of construction may be combined, if desired. It is to be understood that when the valve 31 is in its closed position, the valve 42 is open to its utmost limit and vice versa. Consequently, when the damper 31 is partially open, the damper 42 is moved from its seat a corresponding distance.

It is to be noted that by the construction hereinbefore described, I prevent accumulation of heat in the central or any other one portion of the device and provide for such an equal distribution thereof throughout the heating chamber as to keep the egg chamber practically at all times of a uniform temperature.

The operation will be clearly apparent from the foregoing description when taken in connection with the annexed drawings and a detailed explanation thereof further than has been hereinbefore given does not seem necessary.

From the foregoing it will be seen that I have devised a most efficient, yet simplified form of incubator and while the structural embodiment of the invention as hereinbefore disclosed is what I at the present time consider preferable, it is evident that the same is subject to changes, variations and modifications in structure, proportion and arrangement of parts and I, therefore, do not intend to restrict myself to the particular construction as hereinbefore set forth, but reserve the right to make such changes, variations and modifications as come properly within the scope of the protection prayed.

What is claimed as new is:—

1. In an incubator, means embodying a plurality of conduits one within the other and both discharging through the same outlet, combined with means for automatically controlling the admission of heat to the hot air chamber, ventilating pipes within the hot air chamber having their inner ends terminating in proximity to the floor of the latter, and a casing supporting said conduits and having lateral discharge openings.

2. In an incubator, a hot air chamber, a source of heat disposed exteriorly thereof, a chamber interposed between the two, thermostatic controlled means for controlling the supply of heat from the said chamber to the hot air chamber and simultaneously operated means for the escape of the hot air from said chamber, said closing means being movable in unison in opposite directions, and means for spreading the hot air over the floor of the hot air chamber.

3. In an incubator, a hot air chamber, means therein for uniform distribution of heat within the same, ventilating pipes removed from said heat distributing means and extending within said hot air chamber with their inner ends disposed near the floor thereof near the opposite sides, and means for deflecting the hot air downwardly against the floor of the hot air chamber and to said ventilating pipes.

4. In an incubator, a hot air chamber, means therein for uniform distribution of heat within the same, ventilating pipes removed from said heat distributing means and extending within said hot air chamber with their inner ends disposed near the floor thereof near the opposite sides, and means for deflecting the hot air downwardly against the floor of the hot air chamber and to said ventilating pipes, said pipes having their ends within the hot air chamber bent downwardly and terminating near the floor thereof.

5. In an incubator, a hot air chamber, means embodying conduits one within the other within said hot air chamber for uniform distribution of heat within the same and ventilating pipes removed from said heat distributing means and extending within said hot air chamber with their inner ends disposed near the floor thereof, said pipes being disposed at the rear end of said chamber.

6. In an incubator, a hot air chamber, means for providing for equal distribution of the heat throughout the entire chamber, means for the control of the heat prior to its passage into said chamber, thermostatic means for controlling the heat regulating means and means for spreading the hot air over the floor of the hot air chamber.

7. In an incubator, a hot air chamber, means for providing for equal distribution of the heat throughout the entire chamber, means for the control of the heat prior to its passage into said chamber, thermostatic means for controlling the heat regulating means, means for spreading the hot air over the floor of the hot air chamber, and means for deflecting the hot air from said chamber downward against the floor thereof and from thence upward to ventilating flues.

8. In an incubator, a hot air chamber, means for providing for equal distribution of the heat throughout the entire chamber, means for the control of the heat prior to its passage into said chamber, thermostatic means for controlling the heat regulating means, means for spreading the hot air over the floor of the hot air chamber, means for deflecting the hot air from said chamber downward against the floor thereof and from thence upward to ventilating flues, and ventilating flues having bends, bringing their inner ends in close proximity to the floor of the hot air chamber.

Signed by me at Washington, D. C. this 21 day of Jan. 1911.

PAUL H. HERNDON.

Witnesses:
  E. H. BOND,
  JOHN SCRIVENER.